United States Patent
De Haan et al.

(10) Patent No.: US 6,498,609 B1
(45) Date of Patent: Dec. 24, 2002

(54) CHROMINANCE SIGNAL INTERPOLATION

(76) Inventors: Gerard De Haan, Prof. Holstlaan 6, 5656 AA Eindhoven (NL); Erwin Ben Bellers, Prof. Holstlaan 6, 5656 AA Eindhoven (NL)

(*) Notice: Subject to any disclaimer, the term of this patent is extended or adjusted under 35 U.S.C. 154(b) by 0 days.

(21) Appl. No.: 09/563,301

(22) Filed: May 2, 2000

(30) Foreign Application Priority Data

May 4, 1999 (EP) .......................................... 99201404

(51) Int. Cl.[7] ................................................ G09G 5/02
(52) U.S. Cl. ...................................... 345/589; 345/590
(58) Field of Search ............................... 345/606, 589, 345/590

(56) References Cited

U.S. PATENT DOCUMENTS

| 4,719,503 A | * | 1/1988 | Craver et al. ................. 358/12 |
| 5,029,000 A | | 7/1991 | Colombo ...................... 358/133 |
| 5,170,248 A | | 12/1992 | Min ............................. 358/37 |

OTHER PUBLICATIONS

"IC for Motion–Compensated 100 Hz TV with Natural–Motion Movie–Mode" by G. de Haan, J. Kettenis et al., in IEEE Transactions on Consumer Electronics, vol. 42, No. 2, May 1996, pp. 165–174.

* cited by examiner

*Primary Examiner*—Matthew Luu
(74) *Attorney, Agent, or Firm*—Edward W. Goodman

(57) ABSTRACT

In a method of chrominance signal interpolation, in which output chrominance signals ($OUT_{UV}$) are interpolated (MED) from mutually corresponding input chrominance signals ($IN_{UV}(N-1)$, $IN_{UV}(N)$) from mutually neighboring input images, a color saturation value of at least one of the output chrominance signals ($OUT_{UV}$) is smaller than an average of color saturation values of the mutually corresponding input chrominance signals ($IN_{UV}(N-1)$, $IN_{UV}(N)$) corresponding to the one output chrominance signal ($OUT_{UV}$) if the mutually corresponding input chrominance signals ($IN_{UV}(N-1)$, $IN_{UV}(N)$) meet a predetermined criterion. The expression "corresponding" relates to the chrominance signals concerned ($IN_{UV}(N-1)$, $IN_{UV}(N)$) correspond both as to spatial positions in the mutually neighboring input images (N, N-1) and as to chrominance values, i.e., either U/I or V/Q. The criterion may be that the reference value (REF) lies between the corresponding input chrominance signals ($IN_{UV}(N-1)$, $IN_{UV}(N)$), or that differences between the corresponding input chrominance signals ($IN_{UV}(N-1)$, $IN_{UV}(N)$) exceed a predetermined threshold.

6 Claims, 2 Drawing Sheets

CHROMINANCE SIGNAL INTERPOLATION

BACKGROUND OF THE INVENTION

1. Field of the Invention

The invention relates to a method and device for chrominance signal interpolation. The invention also relates to a display apparatus comprising such a device.

2. Description Of The Related Art

It is known from literature (see Ref. [3] in the List Of References) that the Human Visual System (HVS) is more sensitive to luminance than to chrominance stimuli. Therefore, in many video-processing algorithms, the algorithm applied to the luminance signal is much more advanced then the one applied for the chrominance signal.

In scan-rate-conversion algorithms, like the PROZONIC (see Ref. [1]) and MELZONIC (see Ref. [2]), color processing is non-motion compensated. Motion artifacts in the chrominance signal caused by the conversion from, e.g., 50 Hz interlaced to 100 Hz interlaced are, to a significant extent, masked by the fact that the HVS is less sensitive to the chrominance signal as stated before. However, for very saturated colors, the artifacts can become visible and annoying.

If the luminance signal is motion compensated (MC) while the chrominance signal isn't, a misalignment in moving objects occurs for temporal interpolated images. This misalignment is especially annoying for very saturated dark colors, where the constant luminance principle is jeopardized most severely due to the gamma correction of individual R, G, and B signals.

SUMMARY OF THE INVENTION

It is, inter alia, an object of the invention to provide an improved chrominance signal interpolation. To this end, the invention provides a chrominance signal interpolation method and device, and a display apparatus comprising such a device.

In a method of chrominance signal interpolation in accordance with a primary aspect of the present invention, in which output chrominance signals are interpolated from mutually corresponding input chrominance signals from mutually neighboring input images, a color saturation value of at least one of the output chrominance signals is smaller than an average of color saturation values of the mutually corresponding input chrominance signals corresponding to the one output chrominance signal if the mutually corresponding input chrominance signals meet a predetermined criterion. The expression corresponding means that the chrominance signals concerned correspond both as to spatial positions in the mutually neighboring input images and as to chrominance type, i.e., either U/I or V/Q. The criterion may be that the reference value lies between the corresponding input chrominance signals, or that differences between the corresponding input chrominance signals exceed a predetermined threshold.

These and other aspects of the invention will be apparent from and elucidated with reference to the embodiments described hereinafter.

DESCRIPTION OF THE PREFERRED EMBODIMENTS

The invention eliminates the color misalignment, thereby reducing an annoying artifact. The essential insight on which the current idea relies is that it is better to have no color, or a color with a decreased saturation than a saturated color at the wrong place, which may lead to luminance errors. In short: 'Better less or no color than a wrong color'. As the error only occurs in (fast) moving image parts, a very simple motion detector could provide a signal to switch-off the chrominance in places where it changes significantly. We shall elaborate this basic thought in two more or less equally performing embodiments.

Consider the situation of the conversion of 50 Hz interlaced to 100 Hz interlaced. This is sketched in FIG. 1. In the invention, the chrominance signal can be created in various ways. A first proposal for creating $U(\vec{x},n-\frac{1}{2})$, the intuitive notation for the temporally interpolated field between $U(\vec{x},n)$ and $U(\vec{x},n-1)$, and $V(\vec{x},n-\frac{1}{2})$ is defined by:

$$U(\vec{x},n-\frac{1}{2})=\mathrm{MED}(U(\vec{x},n-1),\mathrm{ref},U(\vec{x},n))$$

$$V(\vec{x},n-\frac{1}{2})=\mathrm{MED}(V(\vec{x},n-1),\mathrm{ref},V(\vec{x},n)) \quad (1)$$

with MED being the median filter operator and ref being a reference signal level, e.g., zero, indicating no-color. $U(\vec{x},n-1)$ and $V(\vec{x},n-1)$ may be vertically interpolated samples. Hereinafter, $U(N-1)$ will be used as a shorthand notation for $U(\vec{x},n-1)$, etc. As a consequence, if $U(N-1)$ and $U(N)$ are on one side of the reference ref, the one closest to the reference is directed to the output. Therefore, temporal interpolation will result in the same chrominance component only if both samples (from the previous and current field) are about equal, which is the case in still picture parts. In moving picture parts, the chrominance component closest to the reference is chosen, i.e., the one that yields the lowest saturation, which eliminates the annoying artifact of misalignment mentioned above. However, the temporally interpolated images contain less color information in moving areas compared to the non-temporally interpolated ones. Although the output chrominance signals contain less color information than in the prior art, it still produces a subjectively better image quality. The misalignment in the prior art simple temporal averaging is much more annoying than the loss of color contrast for half of the images in the 100 Hz interlaced sequence.

Figure 1:
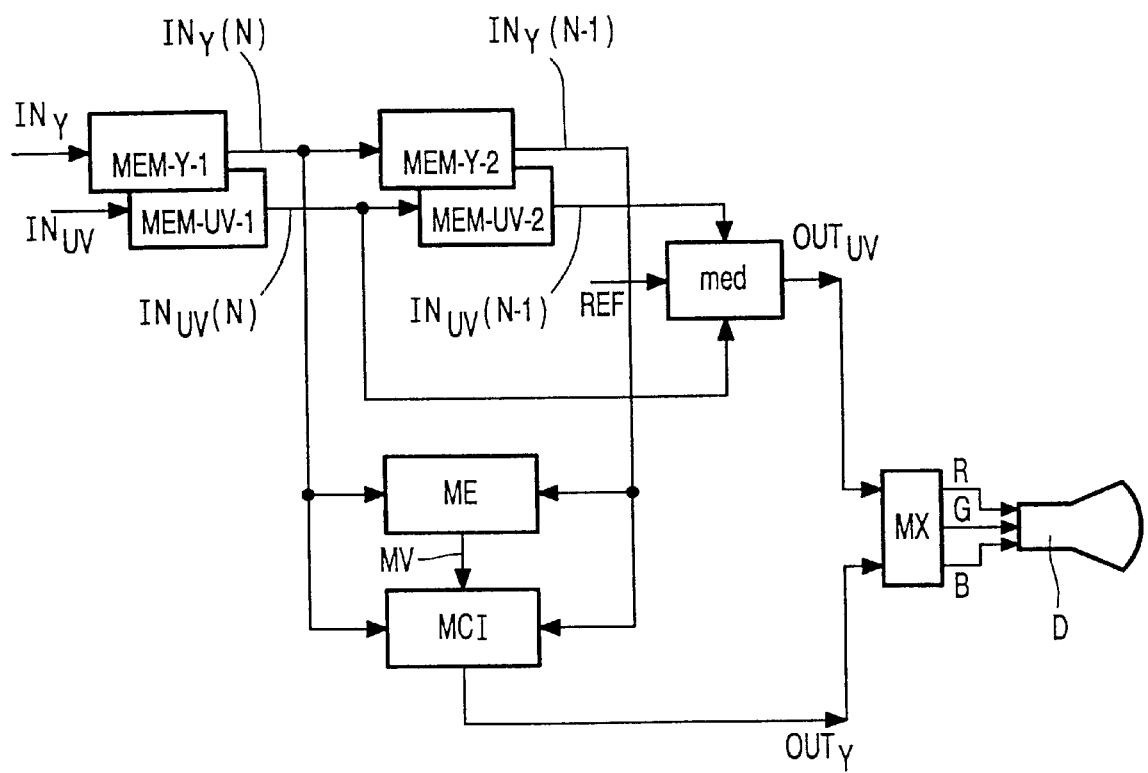
FIG. 1 shows an embodiment of a display apparatus in accordance with the invention.

FIG. 1 shows an embodiment of a display apparatus in accordance with the invention. An input luminance signal $IN_Y$ is applied to a first luminance image memory MEM-Y-1 to generate a luminance signal $IN_Y(N)$ having a doubled field frequency. The luminance signal $IN_Y(N)$ is applied to a second luminance image memory MEM-Y-2 to generate a delayed luminance signal $IN_Y(N-1)$. The luminance signal $IN_Y(N)$ and the delayed luminance signal $IN_Y(N-1)$ are applied to respective inputs of a motion vector estimator ME and a motion-compensated spatio-temporal interpolation circuit MCI. Motion vectors MV estimated by the motion estimator ME are applied to the motion-compensated spatio-temporal interpolation circuit MCI. The motion-compensated spatio-temporal interpolation circuit MCI furnishes an output luminance signal $OUT_Y$.

An input chrominance signal $IN_{UV}$ is applied to a first chrominance image memory MEM-UV-1 to generate a chrominance signal $IN_{UV}(N)$ having a doubled field frequency. The chrominance signal $IN_{UV}(N)$ is applied to a second chrominance image memory MEM-UV-2 to generate a delayed chrominance signal $IN_{UV}(N-1)$. The chrominance signal $IN_{UV}(N)$ and the delayed chrominance signal $IN_{UV}(N-1)$ are applied to inputs of a median filter MED that also receives a reference signal REF. The median filter supplies an output chrominance signal $OUT_{UV}$.

The output luminance signal $OUT_Y$ and the output chrominance signal $OUT_{UV}$ are applied to a matrix circuit MX to obtain RGB signals that are applied to a display D.

A second proposal for creating the chrominance signal is defined by:

$$V\left(\vec{x}, n-\frac{1}{2}\right) = \begin{cases} ref, & (|V(\vec{x}, n-1) - V(\vec{x}, n)| > Th) v (|U(\vec{x}, n-1) - U(\vec{x}, n)| > Th) \\ G(V(\vec{x}, n-1), V(\vec{x}, n)), & \text{(otherwise)} \end{cases} \quad (2)$$

$$U\left(\vec{x}, n-\frac{1}{2}\right) = \begin{cases} ref, & (|U(\vec{x}, n-1) - U(\vec{x}, n)| > Th) v (|V(\vec{x}, n-1) - V(\vec{x}, n)| > Th) \\ G(U(\vec{x}, n-1), U(\vec{x}, n)), & \text{(otherwise)} \end{cases}$$

with G ( ) an interpolation function, e.g., temporal averaging, and Th a threshold. If the difference between the chrominance components exceed a certain threshold, the reference signal, indicating no color, is chosen. If the difference is small compared to the threshold, an average or any other interpolation algorithm can be applied to calculate the output chrominance sample. Therefore, for still picture parts, the chrominance information remains within the image part, and for moving colored image parts, detected by a large difference in the chrominance signals, the chrominance component is reset to 'no-color'.

Figure 2:
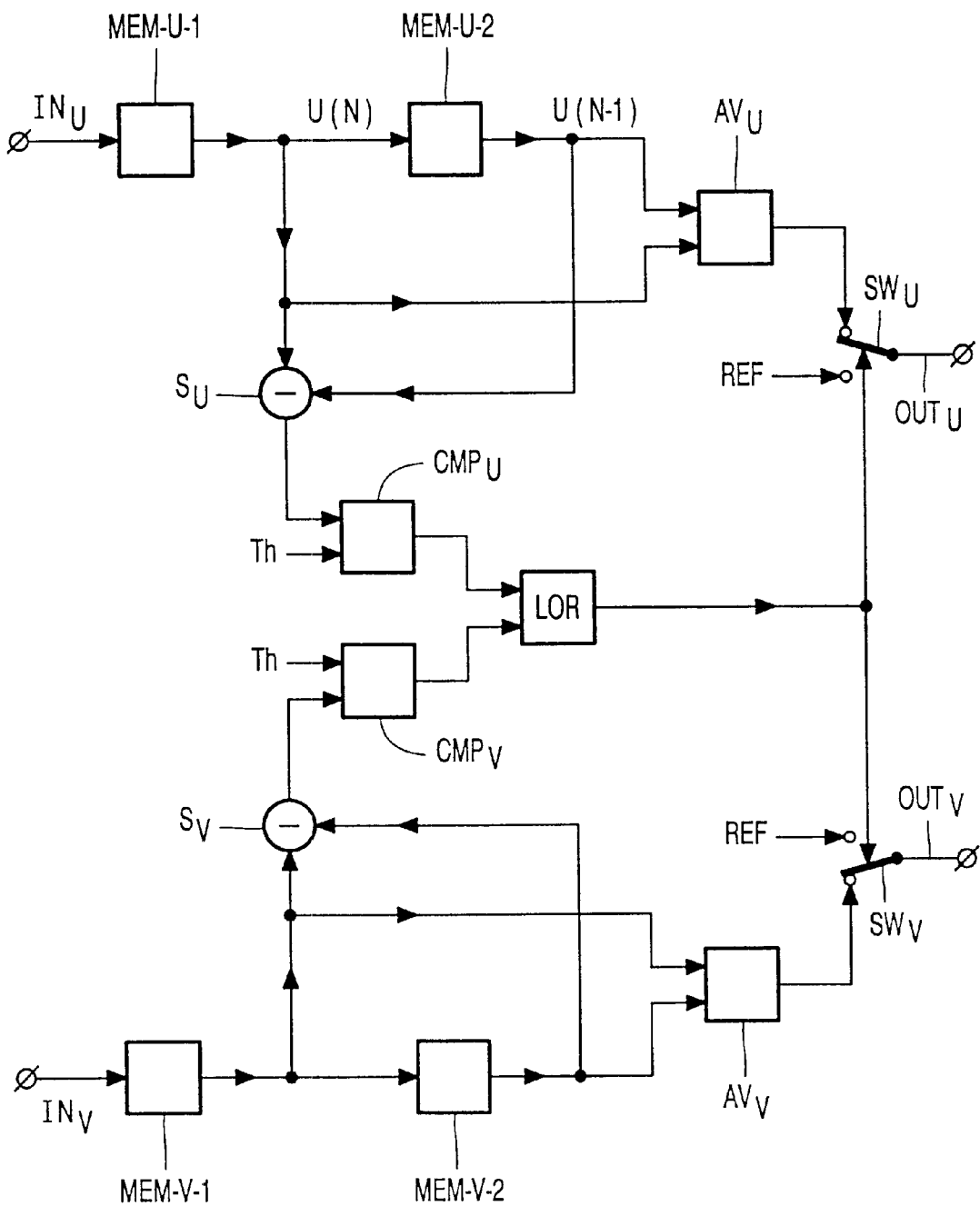
FIG. 2 shows a second embodiment of a chrominance signal interpolation device in accordance with the invention.

FIG. 2 shows a second embodiment of a chrominance signal interpolation device in accordance with the invention, operating in accordance with the second proposal. An input U chrominance signal INU is applied to a first U chrominance image memory MEM-U-1 to generate a U chrominance signal U(N) having a doubled field frequency. The U chrominance signal U(N) is applied to a second U chrominance image memory MEM-U-2 to generate a delayed chrominance signal U(N-1). The U chrominance signal U(N) and the delayed U chrominance signal U(N-1) are applied to inputs of a temporal averaging circuit $AV_U$, the output of which is connected to a first switching contact of a switch $SW_U$. A second switching contact of the switch $SW_U$ receives the reference signal REF. The switch $SW_U$ supplies an output U chrominance signal $OUT_U$. The U chrominance signal U(N) and the delayed U chrominance signal U(N-1) are also applied to inputs of a subtraction circuit $S_U$ for obtaining the absolute value of their difference. A comparison circuit $CMP_U$ compares this absolute difference to a threshold Th.

An input V chrominance signal $IN_V$ is applied to a first V chrominance image memory MEM-V-1 to generate a chrominance signal V(N) having a doubled field frequency. The chrominance signal V(N) is applied to a second V chrominance image memory MEM-V-2 to generate a delayed chrominance signal V(N-1). The V chrominance signal V(N) and the delayed V chrominance signal V(N-1) are applied to inputs of a temporal averaging circuit $AV_V$, the output of which is connected to a first switching contact of a switch $SW_V$. A second switching contact of the switch $SW_V$ receives the reference signal REF. The switch $SW_V$ supplies an output V chrominance signal $OUT_V$. The V chrominance signal V(N) and the delayed V chrominance signal V(N-1) are also applied to inputs of a subtraction circuit $S_V$ for obtaining the absolute value of their difference. A comparison circuit $CMP_V$ compares this absolute difference to a threshold Th.

Outputs of the comparison circuits $CMP_U$ and $CMP_V$ are applied to a logical OR circuit LOR, an output of which is applied to control inputs of the switches $SW_U$ and $SW_V$.

A primary aspect of the invention can be summarized as follows. Future television systems apply motion compensated scan rate conversion to reduce the large area and line flicker without introducing motion artifacts. Although both luminance and chrominance information needs to be converted, the advantage of motion compensation for the chrominance is comparatively small. This disclosure describes an innovative color processing that is cheaper than motion compensation, but better than linear interpolation or simple repetition. A method, and apparatus realizing this method, for video format conversion in which the color signals for a pixel in an interpolated output image $(U/V(\vec{x}, n-\frac{1}{2}))$ depends on the value of these signals in the neighboring original fields $(U/V(\vec{x}, n-1)$ and $U/V(\vec{x}, n))$, characterized in that, in case the values in the neighboring fields are different, at least sometimes the smallest of the two, or the value zero (neutral color), is fed to the output. In alternative embodiments, chrominance signals range from 0 to 255 with the neutral reference value being 127.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware.

LIST OF REFERENCES

[1] Datasheet SAA4990, PROZONIC, 1995.

[2] G. de Haan, J. Kettenis, A. Löning, and B. De Loore. IC for Motion-Compensated 100 Hz TV with natural-motion movie-mode. IEEE Tr. on Consumer Electronics, Vol. 42, No. 2, May 1996, pages 165–174.

[3] A. K. Jain. Fundamentals of Digital Image Processing. Prentice-Hall International Inc., Englewood Cliffs, N.J., 1989.

What is claimed is:

1. A method of interpolating chrominance signals, the method comprising the steps:

furnishing mutually corresponding input chrominance signals from mutually neighboring input images, the mutually corresponding input chrominance signals corresponding both as to spatial positions in the mutually neighboring input images and as to chrominance type; and generating output chrominance signals from the mutually corresponding input chrominance signals, wherein a color saturation value of at least one of the output chrominance signals is smaller than an average of color saturation values of the mutually corresponding input chrominance signals corresponding to the at least one output chrominance signal if the mutually corresponding input chrominance signals meet a predetermined criterion.

2. The method as claimed in claim 1, wherein the color saturation value of the at least one output chrominance signal does not exceed any of the color saturation values of the mutually corresponding input chrominance signals corresponding to the at least one output chrominance signal if the mutually corresponding input chrominance signals meet the predetermined criterion.

3. The method as claimed in claim 2, wherein the generating step includes the step:

calculating each output chrominance signal by taking a median of both mutually corresponding input chrominance signals corresponding to the output chrominance signal and a reference value representing no saturation, said criterion being that the reference value is less than the corresponding input chrominance signals.

4. The method as claimed in claim 2, wherein the generating step includes the steps:

determining whether differences between the mutually corresponding input chrominance signals exceed a predetermined threshold, said criterion being that the differences between the corresponding input chrominance signals exceed the predetermined threshold;

outputting a reference value representing no saturation if the differences exceed the predetermined threshold; and outputting a temporal average of the corresponding input chrominance signals if said differences do not exceed the predetermined threshold.

5. A device for interpolating chrominance signals, the device comprising:

means for furnishing mutually corresponding input chrominance signals from mutually neighboring input images, the mutually corresponding input chrominance signals corresponding both as to spatial positions in the mutually neighboring input images and as to chrominance type; and means for generating output chrominance signals from the mutually corresponding input chrominance signals, a color saturation value of at least one of the output chrominance signals being smaller than an average of color saturation values of the mutually corresponding input chrominance signals corresponding to the at least one output chrominance signal if the mutually corresponding input chrominance signals meet a predetermined criterion.

6. A display apparatus, comprising:

a chrominance signal interpolation device as claimed in claim 5; and a display device coupled to said chrominance signal interpolation device.

* * * * *

UNITED STATES PATENT AND TRADEMARK OFFICE
CERTIFICATE OF CORRECTION

PATENT NO.    : 6,498,609 B1
DATED         : December 24, 2002
INVENTOR(S)   : Gerard De Haan and Erwin Ben Bellers It is certified that error appears in the above-identified patent and that said Letters Patent is hereby corrected as shown below:

<u>Title page,</u>
Insert -- [73] Assignee: Koninklijke Philips Electronics N.V., Eindhoven (NL) --.

Signed and Sealed this

Twenty-ninth Day of July, 2003

JAMES E. ROGAN
*Director of the United States Patent and Trademark Office*